United States Patent [19]

Dillen

[11] Patent Number: 5,530,935
[45] Date of Patent: Jun. 25, 1996

[54] X-RAY EXAMINATION APPARATUS

[75] Inventor: Bartholomeus G. M. H. Dillen, Eindhoven, Netherlands

[73] Assignee: U.S. Philips Corporation, New York, N.Y.

[21] Appl. No.: 308,045

[22] Filed: Sep. 16, 1994

[30]    Foreign Application Priority Data

Sep. 20, 1993  [EP]  European Pat. Off. ............ 93202719

[51] Int. Cl.⁶ ................................................. H04N 1/00
[52] U.S. Cl. ............................. 378/98.2; 378/98.7
[58] Field of Search ........................ 378/8, 95, 98, 378/98.2, 98.3, 98.7, 98.8, 98.12, 114, 115, 116

[56]              References Cited

U.S. PATENT DOCUMENTS

| | | |
|---|---|---|
| 4,533,947 | 8/1985 | Smith . |
| 4,809,309 | 2/1989 | Beekmans ................................ 378/99 |
| 4,881,124 | 11/1989 | Yokouchi et al. . |
| 5,027,380 | 6/1991 | Nishiki .............................. 378/98.8 X |
| 5,101,421 | 3/1992 | Nishiki ................................. 378/98.8 |
| 5,117,446 | 5/1992 | Haaker et al. ...................... 378/95 X |
| 5,164,971 | 11/1992 | Peyret et al. ......................... 378/8 X |
| 5,390,226 | 2/1995 | Tam ..................................... 378/8 x |

FOREIGN PATENT DOCUMENTS

| | | |
|---|---|---|
| 0217456 | 4/1987 | European Pat. Off. . |
| 0479621 | 4/1992 | European Pat. Off. . |
| 0593253 | 4/1994 | European Pat. Off. . |

OTHER PUBLICATIONS

"A High Speed Image Acquisition System For Robotics" J. S. Smith et al, Transactions Of The Institute Of Measurement And Control, vol. 14, No. 4 1992, pp. 196–203.

Primary Examiner—David P. Porta
Attorney, Agent, or Firm—Jack D. Slobod

[57]              ABSTRACT

In an image detection system having a CCD sensor, particularly for an x-ray examination apparatus, image read-out is substantially accelerated. This is achieved by discarding portions of the electronic image that is stored in the image storage-part of the CCD. Thus, only, portions of the image that contain relevant image information are converted into an electronic video signal.

10 Claims, 1 Drawing Sheet

X-RAY EXAMINATION APPARATUS

BACKGROUND OF THE INVENTION

1. Field of the Invention

The invention relates to an x-ray examination apparatus for forming an xray image by irradiating an object, said apparatus including an x-ray image intensifier for converting said x-ray image into a visible image and an image detection system which incorporates a light-sensitive device to convert said visible image into an electronic image, a read-out circuit for reading out said electronic image by transforming said electronic image into an electronic video signal, and a control-circuit for the read-out-circuit. The invention also relates to such an image detection system.

2. Description of the Related Art

An x-ray examination apparatus of said kind has been described in the U.S. Pat. No. 4,881,124.

There are several operating modes for performing x-ray radiology. In particular, a patient to be examined is exposed to a low dose of x-rays continuously or in a series of pulses during fluoroscopy, whereas pulses of a higher dose of x-rays are applied during exposure. An x-ray image intensifier is provided to convert an x-ray image into a visible image which is subsequently detected by a light-sensitive device incorporating a light-sensitive element. Such a light-sensitive element is substantially sensitive to light having a wavelength in a range covering the wavelengths between ultra-violet radiation and infrared radiation. In the x-ray examination apparatus of the cited reference, the light-sensitive element is a photoconductor-type image pick-up tube. When a sequence of x-ray images is made, time-resolution of such a sequence is determined by the image frequency, which itself is determined by the read-out rate of the light-sensitive device. The control circuit is arranged to adjust vertical and horizontal deflection frequencies of the scanning electron-beam of the pick-up tube. The control circuit is further arranged to adjust the scanning electron-beam current. The xray examination apparatus of the cited reference comprises an operating mode selection means. The control circuit adjusts the image pick-up tube in accordance with the selected operating mode, so as to provide proper image frequency and image quality. The control circuit of the known x-ray examination apparatus is not suitable for use together with a solid-state image sensor, notably a charge-coupled device, because such solid-state image sensors do not employ a scanning electron-beam to read out an image. Moreover, said adjustments relate to the entire area of the light-sensitive face of the photoconductive element of the image pick-up tube. Consequently, a control-circuit of the known apparatus is not capable of making adjustments which relate to specially selected parts of images.

SUMMARY OF THE INVENTION

It is, inter alia, an object of the invention to provide an x-ray examination apparatus incorporating an image detection system with a solid-state image sensor, comprising a control-circuit arranged to increase the read-out rate of an electronic image which is formed in the image detection system.

To achieve this object, an x-ray examination apparatus in accordance with the invention is characterized in that the control-circuit is arranged to select a region of interest of the electronic image for forming said electronic video signal from said selected region of interest, so as to reduce the time required for forming said electronic video signal.

When an x-ray examination is performed, an object is irradiated by an x-ray beam and an x-ray image is formed on an entrance screen of the x-ray image intensifier which converts the x-ray image into a visible image. The visible radiation carrying the visible image is detected by the image detection system and converted into an electronic video signal. Such a light-sensitive element is substantially sensitive to light having a wavelength in a range covering the wavelengths between ultra-violet radiation and infrared radiation. The visible image is detected by a solid-state image sensor, notably a charge coupled device (CCD) which converts brightness-values of the visible image into charges so as to form an electronic image. These charges constitute pixel-values of the electronic image and the pixel-values correspond to brightness-values in the visible image. The charges are formed by a multitude of light-sensitive elements having the form of semiconductor photodiodes which are integrated as an integrated circuit constituting an image-recording part of the charge coupled device. Subsequently, the charges which form the electronic image are transferred to an image-storage part of the charge-coupled device. The time required to convert an x-ray image into an electronic video-signal is substantially determined by the time-consuming step of converting the electronic image that is formed in the solid-state image sensor, notably a charge-coupled device (CCD), into an electronic video signal. As in an x-ray examination apparatus in accordance with the invention only a relevant region of interest from an electronic image in the image-storage part of the CCD sensor is used and irrelevant parts which may not even contain any image information at all are discarded. In this way only a part of the charges of the electronic image are converted into the electronic video-signal and consequently the time required to convert the x-ray image into the electronic video signal is substantially reduced.

A preferred embodiment of an x-ray examination apparatus in accordance with the invention is characterized in that the control-circuit is arranged to apply a discard signal to the read-out circuit to discard portions of said electronic image outside said region of interest.

The control circuit is also provided to control a row driver circuit to read out the CCD sensor. When reading out a full frame of an electronic image stored in the storage part of the CCD sensor, respective gate voltages are applied by the row-driver circuit to the CCD sensor so as to shift charge packets which constitute the electronic image, e.g. in a line-by-line fashion to the read-out circuit of the CCD sensor. In accordance with the invention the control-circuit is further arranged to supply a discard-signal to the read-out circuit and/or to the row-driver circuit, so as to discard portions outside the region of interest. Notably, this is performed by discarding charges in the electronic image and outside the region of interest. Correspondingly, only charge-packets that constitute a relevant part of the electronic image are shifted to the read-out-circuit and subsequently converted into the electronic video signal, so that only a part of the charges stored in the storage part of the CCD sensor is employed for the formation of the electronic video signal.

A further preferred embodiment of an x-ray examination apparatus in accordance with the invention is characterized in that the control-circuit is arranged to apply a discard signal to the read-out circuit to discard a first group of lines of said electronic image which first group precedes said region of interest when reading out said electronic image.

A further preferred embodiment of an x-ray examination apparatus in accordance with the invention is characterized in that the control-circuit is arranged to apply a discard signal to the read-out circuit to discard outer sections of a third group of lines of said electronic image, said third group having inner sections inside said region of interest and said outer sections outside said region of interest.

A further preferred embodiment of an x-ray examination apparatus in accordance with the invention is characterized in that the control circuit is arranged to apply a discard signal to the read-out circuit to discard a second group of lines of said electronic image which second group succeeds said region of interest when reading out said electronic image.

The part of the electronic image outside the selected region of interest is divided into three portions. Viz., two respective groups of lines, both of them which are disjoined from the region of interest. One of these groups is located between the region of interest and the read-out circuit, the other group of lines is located at the side of the region of interest facing away from the read-out circuit. A third group of lines has pixels inside the region of interest and pixels outside the region of interest. The pixels of a line of the third group outside the region of interest may form a topologically non-connected collection, forming plurality of outside sections of said line. Discarding portions outside the region of interest is performed by discarding lines of the first and second groups altogether and by discarding the outer sections of the third group of lines.

A further preferred embodiment of an x-ray examination apparatus in accordance with the invention is characterized in that the control circuit is arranged to apply a charge-reset signal to the row-driver circuit to clear the light-sensitive element after reading out said region of interest of said electronic image.

After charges of the region of interest have been read-out from the storage part of the CCD sensor, the remaining charges do not contain relevant image information and the processing time is reduced because no further time-consuming actions are carded out, but instead a charge-reset signal is applied to the row-driver circuit to erase the storage-part of the CCD sensor. After that, the CCD sensor is prepared to shift the next electronic image which has meanwhile been detected in the image-detection part, to the image-storage part.

A further preferred embodiment of an x-ray examination apparatus in accordance with the invention is characterized in that the read-out circuit is arranged to receive charges which are part of said electronic image, and in that said discard signal is applied to the read-out circuit to adjust the read-out circuit so as to add up charges of portions outside said region of interest.

A preferred way of discarding charges of portions of the electronic image outside the region of interest is to add up in the read-out circuit the charges that are to be discarded. To that end, the discard signal is applied to the read-out circuit so as to arrange the read-out circuit in such a way that this circuit adds up charges of portions outside the region of interest, in order to form respective single voltage pulses for each of the first and second groups of lines and of the outer sections of the third group of lines. The formation of such single voltage pulses takes much less time than the formation of an electronic video signal from the collection of charges of portions outside the region of interest. When the output of the read-out circuit is applied to further image processing means, the voltage pulses pertaining to charges of portions outside the region of interest are discriminated from the electronic video signal of the region of interest by means of a filter operation.

A further preferred embodiment of an x-ray examination apparatus in accordance with the invention is characterized in that the read-out circuit is arranged to receive charges which are part of said electronic image, and in that the read-out circuit comprises a drain-circuit connected to a switching device and in that said discard signal is applied to close the switching device so as to carry off charges of portions outside said region of interest to the drain-circuit.

A further preferred embodiment of an x-ray examination apparatus in accordance with the invention is characterized in that the switching device comprises a transistor having a gate arranged to receive said discard signal.

Another preferred way of discarding charges of portions of the electronic image outside the region of interest is to remove said charges in that they are carded off to a drain circuit. The drain circuit is provided with the read-out circuit and is connected to the read-out circuit by a switch that is controlled by the discard signal. Preferably, the switch has the form of a transistor whose drain terminal is connected with the drain circuit and whose source terminal is connected to the read-out circuit. The discard signal is applied to the gate terminal of the transistor. When the gate is activated by the discard signal, the transistor is rendered conductive, i.e. the switch is closed and charges are rapidly carried off from the read-out circuit to the drain circuit, so that these charges are not used for the formation of the electronic video signal.

A further preferred embodiment of an x-ray examination apparatus in accordance with the invention is characterized in that the read-out circuit is arranged to receive charges of successive lines of the electronic image, in that the control circuit is arranged to supply a shift signal to the read-out circuit to shift charges to its output terminal, and in that the control circuit is also arranged to supply a discard signal to add charges of a current line to the read-out circuit, subsequent to the shift of charges of an inner section of a preceding line, so as to keep charges of said inner section of a preceding line apart from charges of an inner section of said current line.

A further increase in read-out rate is achieved by starting the transfer of the next line of the electronic image to the read-out circuit, immediately after charges of an inner-section of the previous line has been transferred from the read-out circuit to an amplifier. Consequently, a line of said third group is not transferred completely to the amplifier before reading-out of a next line of said third group which is started as soon as the part of the read-out circuit that is involved in receiving charges of the region of interest is available. Charges of an inner section of a line of the region of interest are transferred to the amplifier, whereas charges of an outer section of that same line remain in the read-out circuit. Subsequently, charges of the next line is transferred to the read-out circuit and charges of this next line are added to charges still present in the read-out circuit, so that they are added to charges of an outer section of a line read out previously. Adding charges is thus started before an entire line of said third group is read out, so that charges of outer sections are not separately transferred to the amplifier. This embodiment is particularly advantageous in situations where the outside of the region of interest does not contain any image information at all, so that pixels outside the region of interest have a value which is very close to zero. Consequently, the addition of charges of the outer-sections does not give rise to image artifacts.

An image detection system incorporating a light-sensitive device for converting a visible light-image into an electronic image, a read-out circuit for reading out said electronic image by transforming said electronic image into an electronic video-signal, and a control-circuit for adjusting a read-out rate of the read-out circuit, said control circuit is preferably arranged to select a region of interest of the electronic image for forming said electronic video signal from said selected region of interest so as to reduce the time required for forming said electronic video signal.

BRIEF DESCRIPTION OF THE DRAWING

These and other aspects of the invention will become apparent from and will be elucidated with reference to the embodiments described hereinafter and with reference to the accompanying drawings, in which.

DETAILED DESCRIPTION OF THE PREFERRED EMBODIMENTS

Figure 1:
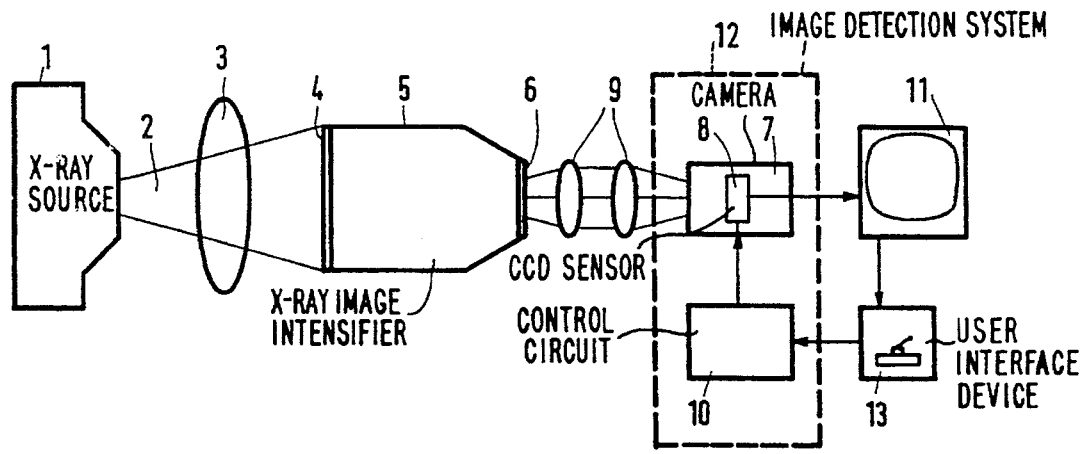
FIG. 1 shows a schematic diagram of an x-ray examination apparatus incorporating an image detection system according to the invention.

FIG. 1 shows a schematic diagram of an x-ray examination apparatus incorporating an image detection system according to the invention. An x-ray source 1 generates an x-ray beam 2 to irradiate an object 3. Due to absorption modulation in the object an x-ray image is formed on an entrance screen 4 of an x-ray image intensifier 5 which converts the x-ray image into a visible image on the exit window 6. The visible image is converted into an electronic video signal by a camera 7. To that end, the visible image is imaged on a light-sensitive face of a solid-state image sensor, notably a CCD sensor 8 by means of an optical arrangement 9. The CCD sensor incorporates a matrix of light-sensitive elements arranged in rows and columns. The CCD sensor is controlled by a control-circuit 10 and the electronic video signal is applied to a monitor 11. The camera 7 with the control-circuit 10 constitute an image detection system 12 for detecting images which are formed on the exit window 6 of the x-ray image intensifier.

Figure 2:
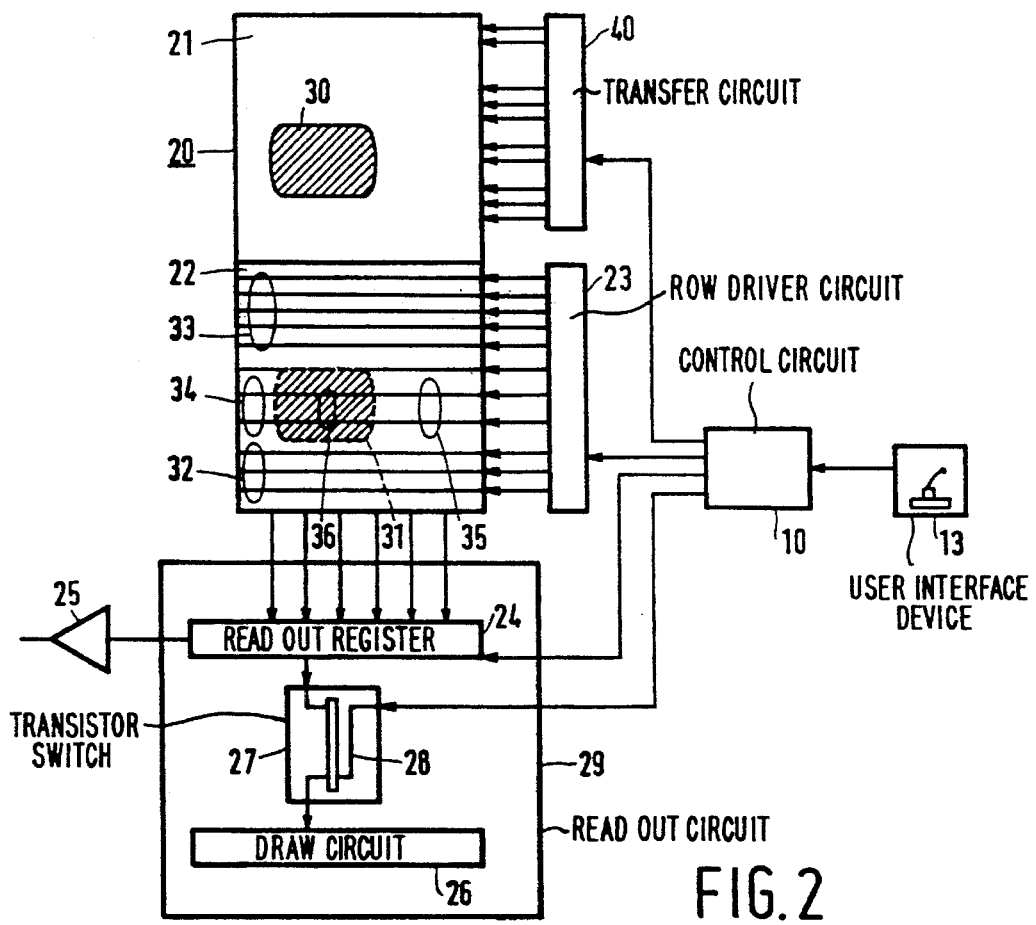
FIG. 2 is a front elevation of an image sensor of an image detection system in accordance with the invention.

FIG. 2 shows a frontal view of an image sensor 8, notably a CCD sensor of an image detection system 12 in accordance with the invention. The face 20 of the CCD sensor is divided into two parts, viz. an image recording-part 21 and an image-storage-part 22. The image-recording-part 21 is exposable to light emanating from the exit window 6 of the x-ray image intensifier 5 and the storage-part 22 is shielded from light. Incident light is convened into electrical charges by photoconductive elements of the image recording-part 21; the quantities of these charges that form an electronic image correspond to image brightness at pixels of the visible image. After an image has been recorded, the entire frame of electrical charges is transferred to the storage-part 22 by way of a transfer-circuit 40, so that the electronic image is stored in the storage-part 22 and the image recording-part is ready to record a following image of a sequence. The storage-part 22 is connected to a row-driver-circuit 23 and to a read-out-register 24, which is incorporated in a read-out-circuit 29. The operation of the row-driver circuit 23, of the read-out circuit 29 and of the transfer-circuit 40 is controlled by the control-circuit 10. Successive lines of charges of the electronic image in the storage part 22 are transferred to the read-out-register 24 by way of the row-driver-circuit 23. The video signal, which is formed in the read-out-register 24, is amplified by an amplifier 25, so that an amplified electronic video signal is formed which is applied to the monitor 11. Reading out the charges and amplifying the ensuing video signals form a relatively time-consuming process. Since the bandwidth of the amplifier is limited to typically 120 MHz, the rate is limited at which the amplified video signal can be formed from the charges that are transferred from the storage part to the read-out circuit, without introducing perturbations. Because of the limitation of the rate at which image lines are read from the storage part the image frequency, i.e. the rate at which successive image ares converted into electronic video signals, is also limited typically to a value of 30 images per second for images having the size of a full frame.

In an image detection system according to the invention, the image frequency is increased as compared to a conventional image detection device. To that end, a region of interest is selected, which is indicated by a contour 30 in FIG. 2. The read-out rate is increased in that only charges which relate to said region of interest are applied to the amplifier 25. The region of interest is selected e.g. manually by means of a user interface device 13, in the relevant embodiment having the form of a joy-stick or a mouse and a selection signal is supplied by the control-circuit 10 for controlling the row-driver-circuit 23 and the read-out-circuit 29. When the electronic image comprising the region of interest indicated by the contour 30 is transferred to the storage part the stored electronic image has a corresponding region of interest which is indicated by the dashed contour 31. The stored electronic image further comprises a group 32 of lines outside the region of interest indicated by the dashed contour 31 and preceding the region of interest when transferring the lines to the read-out circuit 29. Another group 33 of lines of the stored electronic image also lie outside the region of interest and succeed the region of interest when transferring the lines to the read-out-circuit 29. Finally, the portion of the stored electronic image comprises lines which have outer-sections 34 and 35 outside the region of interest and inner-sections 36 inside the region of interest. The control-circuit 10 is arranged to apply a line-discard signal to the read-out-circuit 29 when lines of the group 32 are transferred by the row-driver-circuit 23 to the read-out-register 24. When said line-discard signal is applied to the read-out-circuit 29 the charges are not taken to the amplifier 25, but are carried off to a drain-circuit 26. The carrying off of such irrelevant charges is performed in the present embodiment by a switch having the form of a transistor 27. The transistor may be formed with a source, gate and drain terminal having substantially the same length as the length of the read-out register 24.

In another embodiment the transistor may be provided with multiple source and gate terminals where each column of the CCD sensor and the discard signal is such that various gate terminals can be activated so as to drain charges form various rows and columns of the matrix. The switch is closed for carrying off charges to the drain-circuit by means of a gate-signal which is applied to the gate 28 of the transistor 27. When the group of lines 32 is discarded, the region of interest is meanwhile shifted to the edge of the storage-part adjoining the read-out-circuit 29. Then the control-circuit supplies a section-discard signal to the read-out-circuit 29 to carry off charges of the outer-sections 34 and 35.

Furthermore, the control-circuit supplies a read-out signal to the read-out-register 24 to take the charges of the inner-sections 36 to the amplifier 25 for forming an amplified video signal which contains the image information of the region of interest. After the region of interest has been read-out, only charges of the group of lines 33 remain in the storage-part. These charges do not contain image information which should be transferred to the amplifier 25. The control-circuit then applies a charge-reset signal to the row-driver-circuit to clear the storage-part, so that after clearing the storage part the CCD sensor is ready for transferring the next image to the storage part and for recording that next image in the recording-part.

In another mode of operation of the image detection system according to the invention, the time required to form an electronic video signal is further reduced. When an image is made that contains substantially only image information within the region of interest 31, then charges outside the region of interest 31 in the corresponding electronic image have values which are substantially equal to zero. A shift-signal is applied to the read-out register 24 to shift charges of an inner-section 36 to the amplifier 25, to convert said charges into voltage signals forming the amplified video signal. After charge-packets of an inner-section 36 in the region 31 have been supplied from the read-out-register 24 to the amplifier 25, so that storage space in the read-out circuit is made available, charges that form pixel-values of the outer-section 35 of the same line are left in the read-out-register 24. Subsequently, the next line is read-out from the image-storage part to the read-out register and the charges of this next line are added to the charges still present in the read-out register. When an inner-section 36 of this next line of the region 31 is processed, non-zero pixel-values of that inner-section are added to pixel-values that are close to zero of the preceding outer-section. Thus, the processing speed in increased, because less signal amplitudes need to be applied to the amplifier with a finite bandwidth. Image artifacts are not introduced in this way because only pixel-values being very close to zero of an outer section of a previous line are added to pixel-values of an inner-section of a currently processed line.

An image detection system according to the invention increases the read-out rate of the electronic image by supplying substantially only charges pertaining to a selected region of interest to form an electronic video signal. The increased read-out rate can be employed to display a portion of a full frame at a higher image frequency while displaying the surrounding of the region of interest at a lower image frequency on the monitor 11. The surroundings of the region of interest are displayed at a lower image frequency by interspersing rapid-read-out in accordance with the invention with slower read-out of the electronic image in a conventional way where all charges of the full-frame are applied to the amplifier 25. In medical examinations movements in a part of the anatomy e.g. part of a patient's heart can be studied with a higher temporal resolution. Alternatively, the electronic video signals of a region of interest at a high image frequency can be further processed in order to be displayed on the full size of the monitor 11. Furthermore an image detection system according to the invention can also be employed in an x-ray examination apparatus as an auxiliary light-detection system to perform brightness-control. Such an auxiliary light-detection system, is known per se from the European Patent Application EP 0 217 456 which corresponds to commonly owned U.S. Pat. No. 4,809, 309. The auxiliary light-detection system in accordance with the invention comprises said CCD sensor which is coupled to said control-circuit arranged to select a region of interest of said electronic image. In this embodiment the region of interest is of relevance for performing brightness-control. The electronic video signal from said region of interest is subsequently converted into a control-signal which is supplied to the x-ray examination apparatus for brightness-control e.g. in the form of adjustment of the x-ray source. Because of the time required to form said electronic video signal, the time required to carry out brightness control is reduced and consequently brightness control can be adequately performed at a comparatively high image frequency.

I claim:

1. An x-ray examination apparatus for forming an x-ray image by irradiating an object, said apparatus comprising an x-ray image intensifier for converting said x-ray image into a visible image and an image detection-system which incorporates a light-sensitive device to convert said visible image into an electronic image, a read-out circuit for reading out said electronic image by transforming said electronic image into an electronic video-signal, and a control-circuit for the read-out-circuit, characterized in that the control circuit is arranged to select a region of interest of the electronic image for forming said electronic video signal from said selected region of interest, so as to reduce the time required for forming said electronic video signal, and in that said electronic image signal is used for brightness-control of said x-ray image.

2. An x-ray examination apparatus as claimed in claim 1, characterized in that the control-circuit is arranged to apply a discard signal to the read-out circuit to discard portions of said electronic image outside said region of interest.

3. An x-ray examination apparatus for forming an x-ray image by irradiating an object, said apparatus comprising an x-ray image intensifier for converting said x-ray image into a visible image and an image detection-system which incorporates a light-sensitive device to convert said visible image into an electronic image, a read-out circuit for reading out said electronic image by transforming said electronic image into an electronic video-signal, and a control-circuit for the read-out-circuit, characterized in that the control circuit is arranged to select a region of interest of the electronic image for forming said electronic video signal from said selected region of interest, so as to reduce the time required for forming said electronic video signal, and the control-circuit is arranged to apply a discard signal to the read-out circuit to discard outer sections of a first group of lines of said electronic image, said first group having inner sections inside said region of interest and said outer sections outside said region of interest.

4. An x-ray examination apparatus as claimed in claim 3, characterized in that the control-circuit is arranged to apply a discard signal to the read-out circuit to discard a second group of lines of said electronic image which second group precedes said region of interest when reading out said electronic image.

5. An x-ray examination apparatus as claimed in claim 3, characterized in that the control circuit is arranged to apply a discard signal to the read-out circuit to discard a second group of lines of said electronic image which second group succeeds said region of interest when reading out said electronic image.

6. An x-ray examination apparatus as claimed in claim 3, wherein the image detection device incorporates a row-driver circuit, characterized in that the control circuit is arranged to apply a charge-reset signal to the row-driver circuit to clear the light-sensitive element after reading out said region of interest of said electronic image.

7. An x-ray examination apparatus according to claim 3, characterized in that the read-out circuit is arranged to receive charges which are part of said electronic image, and in that said discard signal is applied to the read-out circuit to adjust the read-out circuit so as to add up charges of portions outside said region of interest.

8. An x-ray examination apparatus according to claim 7, characterized in that the read-out circuit is arranged to receive charges of successive lines of the electronic image, in that the control circuit is arranged to supply a shift signal to the read-out circuit to shift charges to its output terminal, and in that the control circuit is also arranged to supply a discard signal to add charges of a current line to the read-out circuit, subsequent to the shift of charges of an inner section of a preceding line, so as to keep charges of said inner section of a preceding line apart from charges of an inner section of said current line.

9. An x-ray examination apparatus for forming an x-ray image by irradiating an object, said apparatus comprising an x-ray image intensifier for converting said x-ray image into a visible image and an image detection-system which incorporates a light-sensitive device to convert said visible image into an electronic image, a read-out circuit for reading out said electronic image by transforming said electronic image into an electronic video-signal, and a control-circuit for the read-out-circuit, characterized in that the control circuit is arranged to select a region of interest of the electronic image for forming said electronic video signal from said selected region of interest, in that the control-circuit is arranged to apply a discard signal to the read-out circuit to discard portions of said electronic image outside said region of interest, in that the read-out circuit is arranged to receive charges which are part of said electronic image, in that the read-out circuit comprises a drain-circuit connected to a switching device and in that said discard signal is applied to close the switching device so as to carry off charges of portions outside said region of interest to the drain-circuit, so as to reduce the time required for forming said electronic video signal.

10. An x-ray examination apparatus according to claim 9, characterized in that the switching device comprises a transistor having a gate arranged to receive said discard signal.

\* \* \* \* \*